May 21, 1929.  S. MINIERE  1,714,394
RECEPTACLE
Filed April 18, 1928
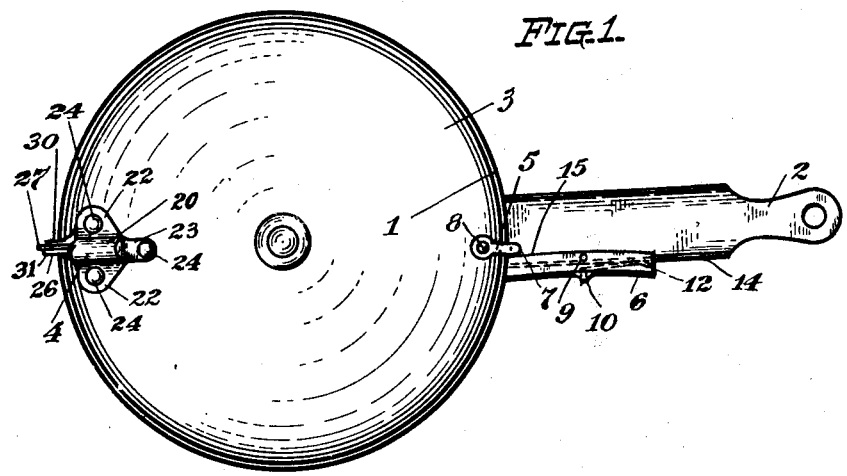
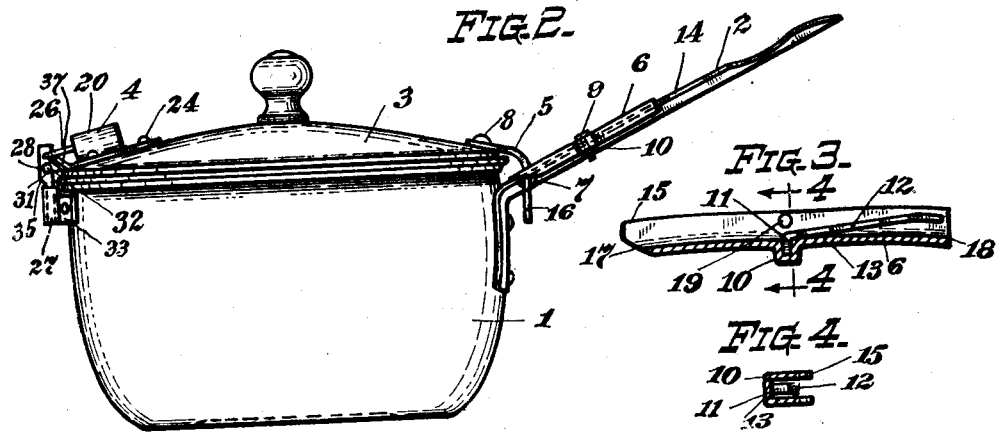
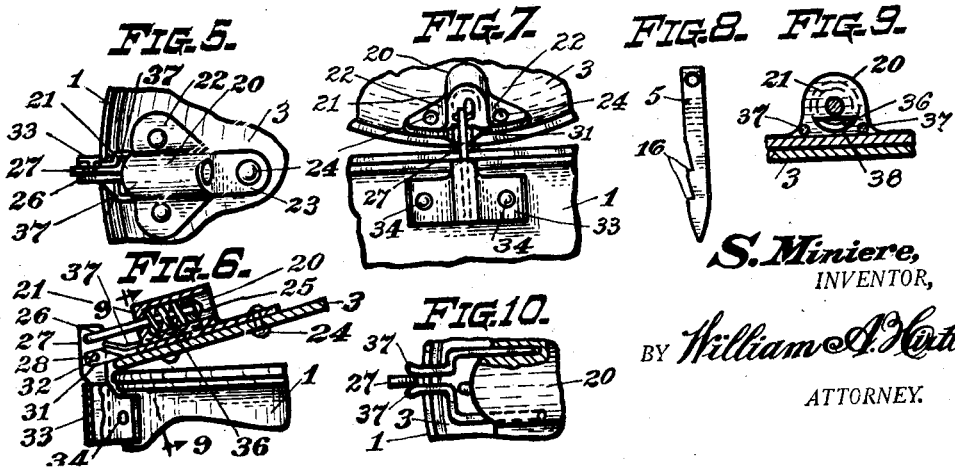
S. Miniere,
INVENTOR,
BY William A. Kittle,
ATTORNEY.

Patented May 21, 1929.

1,714,394

UNITED STATES PATENT OFFICE.

SALVATORE MINIERE, OF PITTSBURGH, PENNSYLVANIA.

RECEPTACLE.

Application filed April 18, 1928. Serial No. 271,120.

The present invention relates to receptacles, or the type normally used for cooking purposes, and which have a lid which is automatically liftable, and means for holding the lid in partially opened position.

In the case of the present invention, it will also be seen as the description proceeds herein, that the lid is also detachable, which in conjunction with the automatically liftable feature of the lid, forms a very desirable combination in such products.

The locking means for securing the lid in closed position, is a very desirable feature of the present invention, and will be more fully set out hereinafter.

In the accompanying drawings forming part of the present specification, I have shown one complete example of my invention constructed according to the best mode I have so far devised for the exemplification of the principles of my invention.

In the drawings, Figure 1 is a top or plan view of a receptacle illustrating the use of my invention.

Figure 2 is a side view of the receptacle shown in Figure 1.

Figure 3 is a longitudinal section of the lid or cover holding means used.

Figure 4 is a cross section of the holding means used taken on 4—4 of Figure 3.

Figure 5 is an enlarged plan view of the automatic lifting means of the cover shown in Figure 1.

Figure 6 is a side elevation partly in section of the lifting means shown in Figure 5.

Figure 7 is an end view of the lifting means, taken from the left of Figure 5.

Figure 8 is a front view of the downwardly projecting prong shown in Figure 2.

Figure 9 is a fragmentary view of a cylinder taken on line 9—9 of Figure 6.

Figure 10 is a fragmetary plan showing the engagement of a pair of parallel yieldable wires with a vertical support used.

In the drawings, the numeral 1 indicates an ordinary pot or kitchen receptacle, provided with the usual handle 2, and lid or cover 3, the latter preferably detachable from said receptacle.

The automatic lifting means for the lid is shown at 4, and consists of a number of parts described below; and the holding means for the cover is shown at 5 and 6, and comprises a number of parts as follows.

The handle 2 is perforated at 7 near the one edge of said handle, and the downwardly projecting prong 5 is mounted rigidly on the lid 3, by means of the rivet 8, and said prong is adapted to slidably engage the perforation 7 as shown.

The receptacle handle has mounted thereon the U-shaped part or locking bar 6, by means of the pivot bolt 9, and it is evident that the bar 6 is pivotally mounted on the handle by means of said bolt. The bar 6 is provided with a bossed portion at 10, adapted to receive the turned end 11 of the spring 12, as clearly shown in Figures 3 and 4 of the drawings. The spring 12 is rigidly mounted in the bossed enlargement 10, and is so shaped that a portion of the spring engages against the wall 13 of the locking-bar, while the free end of the spring engages against the edge 14 of the handle 2, as is at once understood from Figures 1 and 3 of the drawings. It is also evident that when the locking-bar 6 is in normal position on the handle, that the edge 15 thereof will pressingly hold the prong 5 in any desired position within the aperture 7, due to the action of the spring 12 within the locking-bar 6, which tends to press the edge 15 of the locking-bar against the side of the prong 5, and the latter is thereby jammed between the locking bar 6 and the edge of the aperture 7.

It will also be noted that if the cover 3 is raised slightly within the limits of its vertical length, that the locking-bar will hold the lid at any desired position, by the action of the bar 6 just described, against the prong 5. In some cases it may be found advantageous to add notches to the side of the prong as at 16, to make the locking action of the locking-bar 6 more positive in operation, but for all light weight lids, this will be unnecessary, as the frictional grip of the locking-bar is found sufficient to hold the lid in any partially open position. It is desirable sometimes to slightly bend or curve the back wall 13 of the locking-bar in order to provide slightly more movement about the pintle 9, and provide more space in which the spring 12 can operate. This curvature is shown in Figure 3, in which the ends 17, 18 are seen to be bent slightly downward with reference to the central or pivotal point 19 of the bar 6.

The lifting mechanism 4 consists of the following parts, to wit, a cylinder 20 having an integrally closed end 21 thereon, is rigidly mounted on the lid 3 by means of the flanges 22, 22, 23 and the rivets 24. Within the cylinder 20 slidably operates the piston 25, having a stem 26, which is pivotally connected to the vertical support 27. The cylinder 20 also contains the spring 36 which tends to operate against the closed end 21 of the cylinder and the piston head 25 as shown in Figure 6 of the drawings, and thereby lift the lid 3 about its hinge at point 28. The plate or flange portion 22 terminates in a vertically disposed portion forming two lugs or ears 30, 31 which last are perforated to receive the pintle 32 which passes through the vertical support 27. These last described parts form the hinge about which the lid 3 revolves when the lid is lifted, as is at once understood. The vertical support 27 is slidably mounted in the supporting bracket 33, which is rigidly mounted on the walls of the receptacle at 34, 34. It will be seen that as the vertical support 27 is slidably mounted in the bracket 33, that said support and the lid itself thus is made detachable from the body of the receptacle. The shoulder 35 formed on the vertical support prevents the latter 27 from sliding too deeply in the supporting bracket 33, and the parts are nicely adjusted when made, to permit the lid 3 to lie properly on the top edge of the receptacle, and fit closely thereon.

It is evident from the drawings that as soon as the locking bar 6 releases its pressure against the prong 5, that the spring 36 will act, and raise the lid 3 about the hinge at point 28, to a vertical position. The strength of the spring 36 is made of proper strength to lift the lid without too much force, and is accordingly made of a particular strength to lift light or heavy receptacle cover as needed. To provide against too forceful lifting of the lid 3, in some cases it is found desirable to provide the two yieldable wires 37, 37 which are mounted in the part 4, beneath the cylinder 20, and have the ends turned slightly outward, so to engage the sides of the vertical support 27, pressingly and yieldably, and thereby tend to overcome the otherwise abrupt action of the cover 3 when it flies to fully opened or vertical position on the vertical support. For small light lids this is not necessary however, but is a good feature where the spring 36 is found to be somewhat too strong in its lifting action.

It will be seen in Figure 9, that the lowermost end 21 of the cylinder 20, is cut away at 38, Figure 9, to permit any water which collects within the cylinder in cooking, etc. to pass out at the perforation so formed.

I claim:

1. In a receptacle, an automatically liftable lid, a cylinder having a closed end therein, a spring piston slidably operating within the cylinder, a supporting bracket mounted on the receptacle body, a vertical support in the bracket, a pair of parallel ears on the lid hinged to the vertical support, and a piston stem connecting the spring piston and the vertical support, for lifting the receptacle lid to a vertical position when the spring piston is in operation.

2. In a receptacle, an automatic liftable lid, a cylinder having a closed end therein, a spring actuated piston in the cylinder having a stem mounted thereon, a supporting bracket on the receptacle body, a vertical support in the bracket in pivotal engagement with the piston stem, parallel ears on the lid hinged to the vertical support; and means for controlling the lifting action of the spring-actuated piston.

3. In a receptacle, an automatic liftable lid, a pair of ears forming a hinge, a cylinder having a closed end, on the lid, a spring piston having a stem slidably operating within the cylinder, supporting means on the receptacle body, in engagement with the hinge ears of the lid, and in engagement with the piston stem; and holding means for controlling the spring piston, comprising a handle on the receptacle body, a U-shaped locking bar pivotally mounted on the handle, a bossed projection on the locking bar, a downwardly projecting prong on the lid, a perforation in the handle adapted to receive said prong, and a spring mounted in the bossed projection of the locking bar, for causing the latter to engage against the prong, and hold the lid in desired position in the handle perforation.

4. In a receptacle, an automatically liftable lid thereon, means for supporting said lid mounted on the receptacle body, in hinged relation with the lid, means for lifting the lid mounted thereon, and holding means for controlling the lifting means, comprising a receptacle handle, a locking bar pivotally mounted on the handle, a bossed projection on the locking bar, a prong on the lid, an aperture in the handle adapted to accommodate the prong, and a spring mounted in the bossed projection of the locking bar, engaging the edge of the handle, for actuating the locking bar and causing the same to engage against the downwardly projecting prong.

5. In a receptacle, a lid provided with an automatic lifting means, a holding means for controlling the action of the lifting means, comprising a receptacle handle having a perforation therethrough, a locking bar pivotally mounted on the handle, a bossed projection on the locking bar, a downwardly projecting prong mounted on the lid, passing through the handle perforation, and a spring mounted in the bossed projection of the locking bar, and engaging against the edge of the handle for causing the locking bar to engage the side of the downwardly projecting prong.

6. In a receptacle having a lid, a holding means for the lid, comprising a handle having a perforation therethrough, a prong on the lid slidingly operating within the handle perforation, a locking bar on the handle having a U-shaped cross-section, said locking bar provided with a recess, a spring mounted in the recess for actuating the locking bar against the prong, in the latter's action against the edge of the handle perforation.

7. In a receptacle having a lid, a holding means for the lid, comprising a handle having a perforation therethrough, a prong on the lid passing through said perforation, a U-shaped locking bar having a longitudinal curvature, said locking bar provided with a recess, and a spring mounted in said recess, one end of said spring resiliently engaging the edge of the handle, and causing the locking bar and prong to cooperate and hold the latter against the edge of the handle perforation.

8. In a receptacle, a holding means for the lid comprising a downwardly projecting prong mounted on the lid, a handle on the receptacle body, a U-shaped member pivotally mounted on the handle, and adapted to move about said pivoted point as a fulcrum, a bossed projection on the U-shaped member, a spring having one end rigidly mounted in the recess formed by the bossed projection, and its free end in engagement with the edge of the handle, for the purpose of engaging the end of the U-shaped member against the side of the downwardly projecting prong.

9. In a receptacle having an automatically liftable lid, a cylinder mounted on the lid, a pair of yieldable wires in parallel relation mounted in the base of the cylinder, a spring piston having a stem in the cylinder, a supporting bracket on the body of the receptacle, a vertical support in the bracket, having a pair of parallel sides adapted to engage the yieldable parallel wires, a pair of ears on the lid in pivoted engagement with the vertical support forming a hinge for said lid, pivotal means connecting the piston stem and the vertical support together.

10. In a receptacle, an automatically liftable and detachable lid, a pair of ears formed thereon, a cylinder mounted on the lid, a spring piston slidably operating within the cylinder, a supporting bracket on the receptacle body, a detachable vertical support carried in the bracket, in engagement with the aforesaid hinge ears of the lid, pivotal means connecting the vertical support and the spring piston together; and means for controlling the action of the spring piston in lifting the lid to a number of desired positions.

11. In a receptacle, an automatically liftable and detachable lid, a pair of hinge ears mounted thereon, a pair of parallel yieldable wires mounted on the lid, a cylinder on the same, a spring actuated piston slidably operating within the cylinder, a supporting bracket on the receptacle body, a detachable vertical support mounted in the bracket having a pair of parallel sides in engagement with the parallel yieldable wires, and with the aforesaid hinge ears of the lid, pivotal means connecting the vertical support, and the spring piston together; and means for controlling the action of the spring actuated piston in lifting the lid to a number of desired positions.

In testimony whereof I affix my signature.

SALVATORE MINIERE.